United States Patent

Rodgers

[15] 3,685,259

[45] Aug. 22, 1972

[54] SELF-LIMITING ELECTROLYTIC HEATER

[72] Inventor: Franklin A. Rodgers, Brookline, Mass.

[73] Assignee: Pactide Corporation, Cambridge, Mass.

[22] Filed: May 10, 1971

[21] Appl. No.: 141,732

[52] U.S. Cl. .....................55/198, 219/275, 219/284
[51] Int. Cl. ..............................................B01d 19/00
[58] Field of Search..............55/42, 44, 54, 198, 208; 219/275, 284

[56] References Cited

UNITED STATES PATENTS

| 2,016,291 | 10/1935 | Noll | 219/284 |
| 3,053,964 | 9/1962 | Foley et al. | 219/284 X |
| 3,488,474 | 1/1970 | Saunders | 219/284 |

FOREIGN PATENTS OR APPLICATIONS

| 414,388 | 7/1934 | Great Britain | 219/284 |

*Primary Examiner*—Reuben Friedman
*Assistant Examiner*—R. W. Burks
*Attorney*—Brown and Mikulka and Robert E. Corb

[57] ABSTRACT

An electrolytic heater especially adapted to deaerate water by a process in which water is heated to form steam and is counterflowed against the rising steam to strip air from the water. The heater includes an open container divided by a perforated wall into upper and lower chambers and electrodes located in the lower chamber. Water is introduced into the upper chamber, passes through the openings in the wall to the lower chamber where it is heated electrolytically to form steam and from which deaerated water is withdrawn. Steam and water are required to flow in opposite directions through the same openings in the dividing wall so that the flow of each is an inverse function of the other and a balance will be reached automatically limiting the liquid level in the lower chamber and the rate of steam generation resulting from current flow between electrodes.

5 Claims, 1 Drawing Figure

PATENTED AUG 22 1972
3,685,259
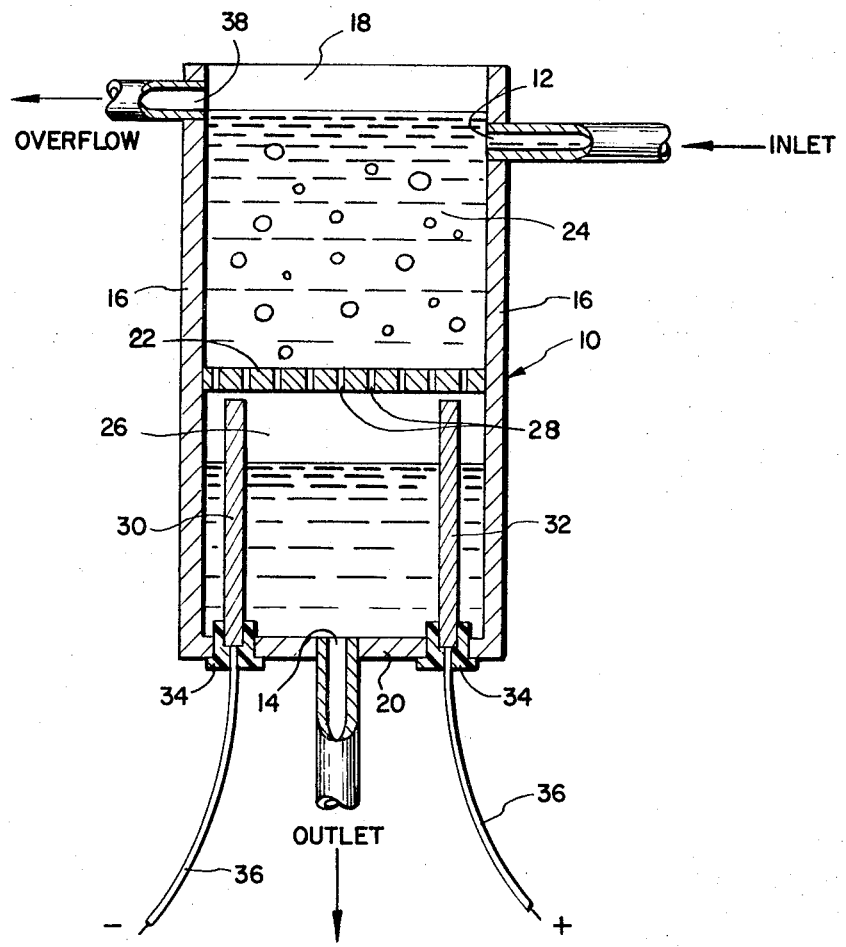
INVENTOR
FRANKLIN A. RODGERS
BY Brown and Mikulka
and
Robert E. Corb
ATTORNEYS

SELF-LIMITING ELECTROLYTIC HEATER

Electrolytic heaters are well known devices for heating liquids, particularly water, and generally comprise a pair of electrodes adapted to be immersed in a liquid such as water which contains impurities, particularly electrolytes, which render the liquid between the electrodes electrically conductive. The current flowing through the high impedance electrical path provided by the water, causes the water to be heated at a rate dependent upon the current flow rate. Thus the current flow rate and heating rate can be varied by changing the area of the electrodes immersed in the conductive liquid. This is accomplished by moving the electrodes and/or by altering the level of the liquid in which electrodes are immersed. Other systems for controlling the heating rate involve varying the electrical potential between the electrodes so as to control the current flow and/or varying the spacing between electrodes so as to control the length and hence, resistance, of the conductive path provided by the conductive liquid.

The present invention has as an object the provision of a simple and inexpensive system having no moving parts for automatically controlling the level of the conductive liquid in which the electrodes are immersed as a function of the rate of vapor (e.g. steam) formation.

A conventional liquid degassing process particularly useful in the deaeration of water involves heating the water to form steam and counterflowing the water in intimate contact with the heated vapor or steam which strips the liquid of the air. A typical water deaeration boiler comprises an open container for holding a column of water including means for heating the lower portion of the column of water and provision for causing the water to flow downward against the rising steam. Frequently the column is filled with packing elements designed to form tortuous passages for causing more intimate contact between the counterflowing water and steam. Deaerator boilers of this type are usually operated such that a very small amount of steam continuously escapes from the surface of the column of water thereby assuring complete deaeration without waste of steam and the heat energy required to produce it. In deaeration systems wherein the rate of flow of liquid through the deaerator boiler, electrical potential, feed water temperature, etc. are subject to change, complex controls have been provided for varying the heat input so as to maintain the rate of escape of excess steam at a constant predetermined value, assuring complete deaeration while maintaining energy loss at a minimum.

Another object of the present invention is to provide an electrolytically heated, deaerator boiler of the type described in which a balance is achieved between steam generation and water flow to automatically control the amount of steam escaping so that it remains substantially constant despite fluctuations in other variables such as the rate of flow of liquid through the deaerator.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing.

The present invention is illustrated in the drawing as embodied in a deaerator boiler especially adapted for deaerating water. Deaerator boilers of this general type find substantial utility in the steam generating and desalination fields wherein it is desirable to improve heat transfer to the water as well as to remove corrosion causing agents by eliminating noncondensible gas from the water. The deaerator boiler generally comprises an open container 10 for holding a column of water with provision for circulating the water downwardly within the container or column. In the simplest form shown, these last-mentioned means comprise an inlet opening 12 near the upper extremity of the container and an outlet opening 14 in the lower part of the container. The outlet opening may be located in the bottom wall of the container as shown in the drawing to permit complete drainage of the container or it may be located above the bottom wall so that a quantity of liquid always remains in the container. In the form shown, container 10 is preferably rectangular and includes planar side walls 16, end walls 18 and a rectangular bottom wall 20, cooperating to form a chamber open at the top. A dividing wall 22 is secured to the end and side walls to separate the container into an upper chamber designated 24 and a lower chamber designated 26. Dividing wall 22 is formed with openings or passages 28 through which water introduced into upper chamber 24 is conducted to lower chamber 26 and through which steam formed in lower chamber 26 passes into upper chamber 24. Dividing wall 22 is joined to the end and side walls of the container so that substantially all of the steam and water are required to pass in opposite directions through openings 28.

Mounted within lower chamber 28 are a pair of electrodes in the form of plates 30 and 32 located in substantially parallel spaced relation and electrically isolated from one another and container 10 by insulating mounts 34. Plates 30 and 32 are connected by suitable leads 36 to a source of electric current for producing a potential across the plates.

In the operation of the deaerator boiler, water is introduced into upper chamber 24 through inlet 12 and is preferable maintained at a predetermined level by conventional means such as, for example, an overflow outlet 38. The water flows downwardly through openings 28 into chamber 26 where it forms a high impedance electrical pathway between electrode plates 30 and 32. Electric current flows across this high impedance electrical path provided by the water thus heating the water to form steam which passes upwardly through openings 28 into upper chamber 24. The rate of current flow and hence the rate of steam generation is a direct function of the level of water by varying the water level of water in lower chamber 26 and this can be varied by varying the water level.

As previously noted, the optimum operating condition is one in which steam is generated at a rate such that a very small amount escapes from the surface of the water within upper chamber 24. If no steam escapes then it is probable that deaeration will not be complete while on the other hand, a relatively large amount of escaping steam represents wasted energy. The rate of steam generation required to maintain this optimum operating condition is, of course, a function of the rate of flow of water into and from the boiler since more steam will be required to deaerate an increased amount of water.

In accordance with the invention, this optimum operation condition is automatically maintained with a simple structure having no moving parts. Automatic control is achieved by virtue of the fact that water and steam are required to flow in opposite directions through openings 28 in dividing wall 22. Thus, if the amount of water withdrawn through outlet 14 is increased the level of water in lower chamber 26 will be reduced thereby reducing the electrical energy input and the amount of steam generated and passing upwardly through openings 28. Reduction in the rate of flow of steam through openings 28 permits water to flow downwardly through the openings at a faster rate tending to restore the water level within the lower chamber and increase electrical energy flow and steam output tending to restore the balance between water flow and steam generation. The rate of flow of water downward through openings 28 is also a function of hydrostatic pressure hence the provision of overflow 38 for maintaining a constant head of water in the upper chamber. Thus it will be apparent that a balance will be achieved between counterflow of water and steam through openings 28 for any particular combination of hydrostatic head number and size of openings and rate of water flow through the deaerator boiler.

While the deaeration system of the invention has been illustrated as including an upper chamber 24 containing only water through which steam passes upwardly, it should be understood that the upper chamber may also contain conventional packing elements of a type well known in the art which provide tortuous counterflow paths for steam and water producing a more intimate contact and intermixing of the steam and water as they flow in opposite directions. This is desirable because the steam collects the noncondensible gasses stripping them from the water solution and the more intimate and thorough the contact between steam and water, the more rapid and complete the stripping operation performed.

The novel, self-limiting electrolytic deaerator boiler of the invention not only balances steam generation against rate of water flow through the deaerator but also may be employed to control the rate of water flow. Control over rate of water flow coupled with steam generation control may be achieved by controlling the size and number of openings 28 in dividing wall 22 and/or by altering the height of the head of water in upper chamber 24. Larger and/or more numerous openings will permit higher water and steam flow rates while the opposite will be achieved by reducing the size or number of openings.

To facilitate the alteration of the balance between steam generation and water flow and/or the rates of each, dividing wall 22 may be constructed so as to be movable upwardly or downwardly to change the volume of upper and lower chambers 24 and 26. It is also possible to provide means such as two relatively movable plates with overlapping openings for variably controlling the number and/or size of the openings through which water and steam are required to flow in opposite directions. In this way it is unnecessary to employ other means for varying steam generation such as mechanically or physically changing the areas of electrode plates 30 and 32 immersed in the liquid, or changing the electrical potential across or the spacing between the electrodes as is suggested in the prior art.

Since certain changes may be made in the above apparatus without departing from the scope of the invention herein involved, it is intended that all matter contained in the above description or shown in the accompanying drawing shall be interpreted as illustrative and not in a limiting sense.

I claim:

1. A self-limiting, electrolytic heater comprising in combination:
   an open container for holding a liquid;
   a wall dividing said container into upper and lower chambers, said wall being formed with openings for permitting the passage of fluids between said upper and lower chambers;
   means for introducing liquid into said upper chamber;
   means for withdrawing liquid from said lower chamber; and
   electrodes mounted in spaced relation in said lower chamber for heating liquid contained therein, said openings being dimensioned to predeterminedly limit the rate of flow of fluids between said chambers.

2. An electrolytic heater as defined in claim 1 including means for controlling the level of liquid in said upper chamber.

3. An electrolytic heater as defined in claim 1 wherein said wall is movable to vary the depth of said chambers and the distance between said wall and the upper extremeties of said electrodes.

4. An electrolytic heater as defined in claim 1 wherein said upper chamber is packed to form tortuous flow paths providing improved contact between downward flowing liquid and the rising, heated vapor thereof.

5. An electrolytic heater as defined in claim 1 wherein substantially the only passages for the flow of liquid and the vapor thereof between said upper and lower chambers are said openings in said wall.

* * * * *